United States Patent
Gafni

(10) Patent No.: US 9,256,724 B2
(45) Date of Patent: Feb. 9, 2016

(54) METHOD AND SYSTEM FOR AUTHORIZING AN ACTION AT A SITE

(75) Inventor: Guy Gafni, Moshav Ben-Ami (IL)

(73) Assignee: SECUREPUSH LTD., Nahariya (IL)

( * ) Notice: Subject to any disclaimer, the term of this patent is extended or adjusted under 35 U.S.C. 154(b) by 268 days.

(21) Appl. No.: 13/221,626

(22) Filed: Aug. 30, 2011

(65) Prior Publication Data

US 2013/0055356 A1 Feb. 28, 2013

(51) Int. Cl.
*G06F 7/04* (2006.01)
*G06F 11/00* (2006.01)
*G06F 21/40* (2013.01)
*H04L 29/06* (2006.01)

(52) U.S. Cl.
CPC ............ *G06F 21/40* (2013.01); *H04L 63/0853* (2013.01)

(58) Field of Classification Search
CPC ......... G06F 17/60; G06F 15/16; G06F 21/00; H04L 63/0853
USPC ............................ 726/3, 4, 5, 1, 6, 22; 705/42
See application file for complete search history.

(56) References Cited

U.S. PATENT DOCUMENTS

| | | | | |
|---|---|---|---|---|
| 7,346,775 | B2 * | 3/2008 | Gasparinl | G06F 21/31 709/225 |
| 7,613,659 | B1 * | 11/2009 | Hoffman | C07K 14/53 705/14.26 |
| 8,611,928 | B1 | 12/2013 | Bill | |
| 8,769,784 | B2 * | 7/2014 | Ganesan | G06F 21/31 26/4 |
| 2003/0149600 | A1 * | 8/2003 | Williams | 705/5 |
| 2007/0234410 | A1 * | 10/2007 | Geller | G06F 21/31 726/8 |
| 2009/0271854 | A1 * | 10/2009 | Hazlehurst | G06F 21/41 726/7 |
| 2010/0023437 | A1 * | 1/2010 | Davis | 705/35 |
| 2010/0211997 | A1 | 8/2010 | McGeehan et al. | |
| 2011/0010415 | A1 * | 1/2011 | Kodama | 709/203 |
| 2012/0030110 | A1 * | 2/2012 | Prakash et al. | 705/44 |
| 2013/0005352 | A1 * | 1/2013 | Jones et al. | 455/456.1 |
| 2013/0013501 | A1 * | 1/2013 | Rackley et al. | 705/41 |

(Continued)

FOREIGN PATENT DOCUMENTS

| | | |
|---|---|---|
| EP | 1983465 | 10/2008 |
| EP | 2074546 | 7/2009 |

OTHER PUBLICATIONS

Search Report of International Patent Application No. PCT/IL2012/050334 dated Dec. 4, 2012.

(Continued)

*Primary Examiner* — Abu Sholeman
(74) *Attorney, Agent, or Firm* — Pearl Cohen Zedek Latzer Baratz LLP

(57) ABSTRACT

A method for authorizing a single action by a plurality of users at a site may include registering each of the users and at least one mobile communication device associated with that user with an authorization module, identifying the mobile communication device by a unique hardware identification number. The method may also include associating each of the users and the mobile communication device associated with that user with the site by the authorization module. The method may further include requesting each of the users to confirm the action by sending a confirmation request from the site to the mobile communication device associated with that user by the authorization module. The method may also include authorizing the action upon receiving confirmation from the mobile communication devices of all users that are required to authorize that action.

8 Claims, 5 Drawing Sheets

(56) References Cited

U.S. PATENT DOCUMENTS

2013/0046689 A1\* 2/2013 Sundberg et al. ............... 705/42
2013/0046692 A1\* 2/2013 Grigg et al. ..................... 705/44

OTHER PUBLICATIONS

Office action issued for U.S. Appl. No. 14/249,683, filed Nov. 4, 2015.

\* cited by examiner

METHOD AND SYSTEM FOR AUTHORIZING AN ACTION AT A SITE

FIELD OF THE INVENTION

The present invention relates to authentication. More particularly, the present invention relates to method and system for authorizing an action at a site.

BACKGROUND

Present day information technology (IT) is characterized by an abundance of electronic sites that are available, accessible by users over public (e.g. the Internet) and private (e.g. local) networks. A "site", in the context of the present application, refers to any site that may be accessed by a user, such as, for example, an Internet site, an organizational management intranet system (e.g. Customer Relationship Management—CRM—system), a credit-card transaction approval system (e.g. remote systems, such as, for example, PayPal or local systems), an email box (e.g. Hotmail, Gmail etc), a bank account, an Automated Teller Machine (ATM) and so on.

Some of these sites only provide access to information (e.g. general, public, private and confidential information), while other sites allow users to view information as well as perform an action.

The access to some sites is not limited, whereas other sites limit the access and require that certain conditions be met in order to allow a user to access the site. Typically, sites with limited access require some form of identification and authentication. In many cases a user is required to register to that site, by selecting a user name and a password and in many cases also other personal information depending on the particular site requirements, and later on provide the user name and password (or other information) in order to access that site or perform an action at that site.

In most cases the access information a user is required to provide in order to gain access to a site is simple and may easily be apprehended. For example, in order to successfully complete a credit-card transaction over a network e.g. the Internet), a buyer is usually required to provide a full name, an address, credit card number, expiry date (sometimes also a Card Verification value—CVV—number located on the back of the credit card). Such information may not be too hard to obtain (e.g. overlook a person using a credit card or overhear a conversation in which this information is mentioned, or by having a Trojan Horse type virus installed on the user's computer for sending all typed information to a remote computer).

It is also known that many users (some even claim that this is true for the majority of users) tend to register in many sites using the same user name and password, or use very similar registration details by changing only one or a few letters or digits). Thus, if a users name and password are unlawfully apprehended, many sites to which that user is registered may be illegally accessed by others disguising as that user. Such unlawful access may result in private information being exposed, fraud and other illegal actions that may cause extensive damages.

Sometimes it is one of the sites that a user is registered to, which is hacked, and valuable personal information may be unlawfully retrieved and used for accessing other sites the user is registered to.

Current authentication methods typically do not address the situation in which more than one person is required to confirm an action. For example, many businesses and organizations require that two (or more) persons authorize an action, such as when engaging in a legal contract, performing a financial transaction, performing an action in a bank account, etc. Strangely enough, to-date, executives of such businesses and organizations are allowed to charge their company's credit card or draw money from an ATM machine without another person authorizing their transaction just because technically the credit card company has no technology to support that requirement.

The need for a more secured authentication has brought about the use of additional authentication measures. Two-factor or multi-factor authentication methods were introduced that require the presentation of two or more independent kinds of identity evidence.

Multi-factor authentication involves the use of two or more independent kinds of evidence to assert an entity, rather than two or more iterations of the same kinds. In essence, there are three independent means for establishing identity, which may be characterized as something the user knows (e.g., user-name, password, personal identification number—PIN), something the user has (e.g. a physical token, ID card, passport), and something the user is (e.g. biometric information, such as a fingerprint, retinal scan, face geometry).

It is generally accepted that any combination of these independent authentication means (e.g. password+value from a physical token) is multi-factor authentication.

Multi-factor authentication may include, inter-alia:

1. A designated security hardware component, which an authorized user is to use when connecting to a site. The hardware component is attached to the user's local machine or a hand-held machine (e.g. terminal, PC, PDA, smartphone, tablet), and includes authentication information pertaining to the user that the remote site requires, in addition to the regular login details the user is required to produce, in order to allow the user to gain access. Examples of such hardware component may include smart cards, fingerprint reader, USB plug, etc.

2. Some networks are designed to protect their users by offering a precluded space in which only select users, such as for example, VPN (Virtual Private Networks). Such networks allow only specific stations, devices or users identified in the network to access sites and services in that network.

3. Ciphering certificate protocols are also known (e.g. SSL certificates), which are installed on specific stations and on the remote site to confirm authorized access to the remote site by comparing the certificate from the station with the expected one on the site.

4. Sending confirmation messages with a unique code (e.g. SMS, email) to the user, confirming the execution of a transaction allegedly made by that user at the site by entering the sent code as a part of the regular login process.

5. Installing software on a second hardware device (like phone, smart USB keys, hardware devices like firewalls and routers) that generates random codes so that each time a user attempts to access a site, the generated code has to be used (manually or automatically input) during the access procedure, after providing the login details 6. Performing risk evaluation (typically used for credit-card transaction confirmations and money transfers), to calculate a risk level for that transaction in order to determine whether to authorize that transaction and execute it.

7. Human intervention (typically used for credit-card and banking transaction confirmations), which involves a human contacting the user to verify a specific transaction prior to its final confirmation, sometimes requiring additional authentication information (e.g. billing address, ID number and even send physical documents by fax or email etc,).

SUMMARY OF THE INVENTION

There is thus provided, in accordance with embodiments of the present invention, a method for authorizing a single action by a plurality of users at a site. The method may include registering each user of the plurality of users and at least one mobile communication device associated with that user with an authorization module, identifying each of said at least one mobile communication device by a unique hardware identification number. The method may also include associating each of the users and the mobile communication device associated with that user with the site by the authorization module. The method may further include requesting each of the users to confirm the action by sending a confirmation request from the site to the mobile communication devices associated with each of the users by the authorization module. The method may also include authorizing the action upon receiving confirmation from the mobile communication devices of all the users that are required to authorize that action.

In accordance with embodiments of the present invention, the method may include registering the site with the authorization module.

In accordance with embodiments of the present invention, the method may also include installing a dedicated application in the communication device of each of the plurality of users.

In accordance with embodiments of the present invention, the mobile communication devices may comprise at least one cellular telephone. In some embodiments the cellular telephones may be smartphones In accordance with embodiments of the present invention, the method may also include determining a location for one or more of the mobile communication devices and verifying that that location is within one or more zones.

In some embodiments these one or more zones may include a zone within which one or more of the users is supposed to be.

In accordance with embodiments of the present invention, the steps of requesting each user to confirm the action and the step of authorizing the action may be subjected to a time limit.

In accordance with embodiments of the present invention, there is provided a method for authenticating a user at a site. The method may include registering the user and at least one mobile communication device associated with that user with an authentication module, identifying each of said at least one mobile communication device by a unique hardware identification number. The method may also include registering the site with the authentication module. The method may further include associating the user and said at least one mobile communication device with the site by the authentication module. The method may also include requesting the user to confirm the action by sending a confirmation request from the site to the mobile communication device associated with that user by the authentication module, and authenticating the user upon receiving the confirmation from the mobile communication device.

In accordance with embodiments of the present invention, the method may include receiving the confirmation from two or more mobile communication devices.

In accordance with embodiments of the present invention, the method may further include registering a new mobile communication device associated with that user with the authorization module that replaces registered mobile communication device.

In accordance with embodiments of the present invention, the method may include using a common key which is known to the site to be associated with the user and which is known to the authentication module, and used by both the site and the authentication module.

In accordance with embodiments of the present invention, the method may also include using one or more temporary keys during communications between the site and the authentication module and between the communication device and the authentication module.

In accordance with embodiments of the present invention, the method may include determining a location for one or more of the mobile communication devices and verifying that that location is within one or more zones.

In accordance with embodiments of the present invention, the zones may include a zone within which the user is supposed to be.

In accordance with embodiments of the present invention, the steps of requesting the user to confirm the action and the step of authenticating the user are subjected to a time limit.

BRIEF DESCRIPTION OF THE DRAWINGS

Embodiments of the present invention are described in the following detailed description and illustrated in the accompanying drawings in which.

DETAILED DESCRIPTION OF EMBODIMENTS OF THE INVENTION

Figure 1:
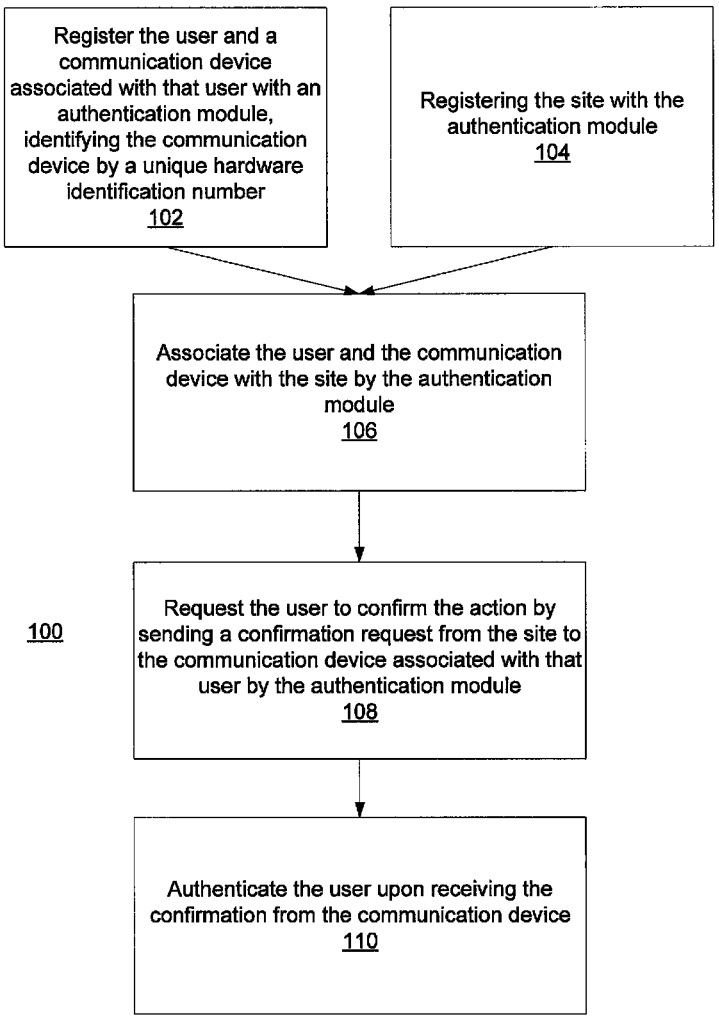
FIG. 1 illustrates a method for authenticating a user at a site, in accordance with embodiments of the present invention.

Embodiments of the present invention, relating to single-factor, two-factor or multi-factor authentication method and system are presented herein.

An aspect of the present invention relates to the use of a communication device (typically a mobile communication device, but in some embodiments an immobile communication device may be used), which is capable of executing a software application (or hardware, or a combination thereof) allowing a user to input information and/or commands. In some embodiments of the invention the communication device may be, for example, a cellular telephone, especially—but not only—a smartphone).

Another aspect of the present invention is the use of a unique hardware identification number, which is embedded in hardware of the communication device (e.g. IMEI number) in connection with authentication methods and systems, in accordance with embodiments of the present invention.

According to some embodiments of the invention there may be total separation of identity information between the communication device of the user and the site which the user is accessing. The association between the user and the site is solely performed and managed by an independent authentication server, which may employ various permanent and temporary verification keys.

Other aspects of the present invention involve making use of various capabilities of communication devices such as mobile telephones (e.g. smartphones), including communicating via a telecommunication network, acquiring images and other capabilities.

Subscriber Identity Modules (SIM) are synonymous with mobile phones and devices that interoperate with GSM cellular networks. Under the GSM framework, a cellular phone is referred to as a Mobile Station and is partitioned into two distinct components: the Subscriber Identity Module (SIM) and the Mobile Equipment (ME). A SIM is a removable component that contains essential information about the subscriber. The ME, the remaining radio handset portion, cannot function fully without one. The SIM's main function is to authenticate the user of the cell phone to the network in order to gain access to subscribed services.

Moving a SIM between compatible cell phones automatically transfers with it the subscriber's identity and the associated information and capabilities. While SIMs are most widely used in GSM systems, comparable modules are also used in iDEN phones and UMTS user equipment (i.e., a USIM). Because of the flexibility a SIM offers GSM phone users to port their identity, personal information, and service between devices, eventually all cellular phones are expected to include (U)SIM-like capability. For example, requirements for a Removable User Identity Module (R-UIM), as an extension of SIM capabilities, have been specified for cellular environments conforming to TIA/EIA/IS-95-A and -B specifications, which include Wideband Spread Spectrum based CDMA.

However, typically all GSM, WCDMA, and iDEN mobile telephone handsets have a unique hardware identification number—e.g. International Mobile Equipment Identity IMEI number—which distinctly identifies each handset. The IMEI number is used, for example, to identify valid devices and therefore can be used for stopping a stolen phone from accessing the network in that country.

While the use of the IMEI number is described herein, the use of an alternative unique identification data that uniquely identifies a handset may be considered too, according to embodiments of the present invention.

Another aspect of the present invention is the provision and management of a method for authentication of a user for allowing the performance of an action by that user at a site, using a third party authentication server to which both the user and the site must be registered.

According to embodiments of the present invention, the user who has in his or hers (hereinafter, for brevity—his) possession a communication device first registers to the authentication service. This may be carried out, for example, by installing a dedicated application on the communication device which is designed, when executed, to request the user to provide basic identification information (e.g. username and password) and send to the authentication server the basic identification information as well as a unique identification number associated with the hardware of the communication device (e.g. IMEI number). In some embodiments of the invention, more than one unique identification number associated with the hardware of the communication device may be used (e.g. IMEI and PUSH numbers).

According to embodiments of the invention, the authentication server assigns the user a unique user key for use when communicating with the site, with which that user is associated at the authentication server. This is to avoid exposing the real unique identification number of the communication device when the server is communicating with the outside world.

The site registers with the authentication server too by providing site identification information (e.g. one or more of the following identification details: site name, site description, unique IP address, domain name etc.). The authentication server assigns that site a unique connection key. According to embodiments of the invention the authentication server then provides a proxy file which is suited for use on that site (according to the development environment of that site) which facilitates working with cross-domain technology, as will be explained hereinafter.

Next, the user may register to the site. The registration to that site may be carried out in the regular manner which that site requires. Typically such registration requires the user to provide basic identification information (e.g. name, address, user name, age, ID number, etc.), which is not necessarily (and in fact it is recommended that it is different from) the identification information which the user had provided to the authentication server in the process of registering to the authentication server using the dedicated application.

In the registration process of the user to the site, when the user chooses to use the authentication method according to the present invention, or if the site requires that, the site requires the user to associate his communication device with that site. This may be accomplished, for example, by presenting to the user site data that includes the unique site key which was assigned to it by the authentication server in the process of registration of the site to the server, and which has to be acquired using the communication device. Once the communication device has acquired the site data it is communicated by the dedicated application to the authentication server. The authentication server then associates the communication device of the user (and the user) to the site and generates a common communication key which is saved by the site and from that time on is used by the site when dealing with the user through the authentication server.

Next time, when the user attempts to access the site, the site sends the common communication key to the authentication server and the authentication server, which knows the actual real unique identification number of the communication device, sends to the appropriate communication device a confirmation request. (and push message) The holder of the communication device—which is presumably the authorized user—is prompted by the dedicated application to confirm the request. That conformation is communication by the dedicated application on the communication device to the authentication server, and the server, upon verifying that the communication device is indeed associated with that user authenticates that user to the site. Upon receiving this authentication the site allows the user access or performance of an action in that site.

In some embodiments of the invention, the use of temporary keys (e.g. unique identifiers) which are time limited may be involved so as to increase security.

Using the authentication method according to embodiments of the present invention reduces the risk of security breach by creating the need for independent identity verification both form the site and the user by a third party.

According to embodiments of the invention, the user may, at any time, replace his registered communication device by registering another communication device. When the new device is registered the previously registered device becomes unregistered.

In other embodiments of the invention, the user may register a plurality of communication devices, or add new communication devices to the one already registered. In some embodiments the user may use either one of his registered communication device for the authentication action. In some other embodiments the user may be required, or choose, to use two or more of his registered communication devices for a single authentication action.

The mobile equipment identity information may be, for example, IMEI number.

According to some embodiments of the present invention, the mobile equipment identity information may be obtained automatically, without the intervention of a human user. This may be accomplished, for example, by installing a designated application on the mobile communication device which is designed, when executed, to access the mobile equipment identity information embedded in the mobile communication device (also referred to, in the present application, as "the handset") and forward it at a first instance for registration, and at later instances for verification.

According to some embodiments of the present invention, an authentication service may be provided, for facilitating authentication of a user attempting to access a remote site.

In some embodiments of the present invention, the authentication service may be administered by an authentication entity which is independent from the user or from the site. For example, the authentication entity may be embodied in the form of an authentication module, which is designed to communicate with the site and with the user over one or more communication networks (e.g. the Internet, mobile communication network)

According to some embodiments of the invention, a user may register to the authentication service provided by the authentication module by installing a designated application (hereinafter referred to as "the application") on a mobile communication device (hereinafter referred to, for brevity, as "the handset") which is at the users disposal. In some embodiments of the present invention it may be required that the handset be in the possession of that user or that the user be a registered user of the handset.

At an initial instance, the application, when executed, may allow the user to register to the service by providing personal identification information (e.g. username, password, email address). At the registration instance the application may assign the handset with one or more security keys. Said one or more security keys, according to some embodiments of the present invention may comprise, for example, a first key that includes mobile equipment identity information which is unique to each handset (and thus allowing distinction between different handsets). In some embodiments of the invention, the security keys may also include a second unique key which is uniquely assigned to that handset. Registration information of the handset (e.g. its uniquely associated security keys) may be saved and accessed by the authentication module, associating it with the user. According to embodiments of the present invention the registration of the handset may be performed using a communication connection between the handset (e.g. over the Internet, using a cellular communication network for accessing the Internet).

Independently of the registration of the user, a site operator may register the site to an authentication service, according to embodiments of the present invention. In the registration process of the site it is provided with one or more security keys, for example, a site token and connection token. The site token may be designed to identify an owner or operator of the site. In some embodiments of the invention, the owner or operator of the site may be linked to more than one site for the authentication service. The connection key may be used to uniquely identify the specific site.

According to some embodiments of the present invention the site may also be provided with a computer executable code which includes the tokens and is designed to conform to the operation environment of the site. The site may also be provided with a proxy code (file) facilitating a cross-domain operation. The code may then be incorporated in the site (e.g. at the registration page and at the login page of the site).

A user may access remote sites using a station (e.g. terminal, PC) which may communicate with the site over a communication network (e.g. the Internet). When the user wishes to register to a remote site which is registered to the authentication service, according to embodiments of the present invention, the site may require an initial registration process that involves associating the user with personal identification information (e.g. username, password, which may be different that the personal identification information associated with that user at the authentication module). During the registration process of the user to that site, the site generates a call to the authentication module to present the user with user security keys, e.g. displaying it to the user on a display device of the user (locally, at the user's station) in a separate window (e.g. employing cross-domain technology, activated by the proxy code). The security codes may include the security codes that were assigned to the site by the authentication module (e.g. the site token and the connection token) as well as a third security code—attach key. The third code is designed to uniquely offer to the handset, validating the connection with the handset of the user. Typically, the third code (the attach code) is a temporary code valid for a short period of time. The short period of time may be, for example, the time the cross-domain window is displayed to the user. Each time the cross-domain window is displayed a different attach key is generated.

The three security codes presented in the cross-domain window may be provided in the form of a barcode. The barcode may be, for example, a one-dimensional bar-code (e.g. linear barcode) or two-dimensional barcode (matrix barcode, such as, for example Quick-Response—QR-code.

According to embodiments of the invention the user may point the camera of the handset to the barcode in the cross-domain window and acquire an image of the barcode. For example, the application may prompt the user to aim the camera of the handset towards the screen and the acquisition of the image is performed automatically when the camera is found to point at the barcode. Alternatively, the user may be prompted to activate the camera and acquire the image of the barcode.

Embedding the three keys in a barcode allows hiding the keys from preying eyes and may be preferred, but in some embodiments of the present invention the keys may be presented unhidden so that the user may input them into the smartphone manually. Other forms of graphical presentation may also be possible, which involve acquiring an image by the handset's camera and extracting the key information using image processing (e.g. OCR).

The application extracts the three codes from the barcode and communicates the retrieved codes to the authentication module, for associating the handset with the site. If the three communicated keys are found valid at the time they are received at the authentication module the user, with the user's handset are associated with the site, and a forth key—secret token is generated by the authentication module. The authentication module communicates to the site two keys—the attach token and the secret token, which are saved at by the site and are associated with the user in the registration record for that user, for future reference, next time the user attempts to access the site.

The use of an additional forth code (secret code) may be advantageous as the third code (the attach code) remains for a substantially long time in the memory of the station during the registration process, and malicious spyware may apprehend this code and manipulate the application to confirm an action. To prevent this from happening, in accordance with embodiments of the invention, the forth code (key) (the secret code (key)) may be generated and communicated to the site just before the cross-domain window is closed (e.g. 0.01 second before the cross-domain window is closed), so as to eliminate, or at least greatly reduce the risk of apprehension of the code (key) by a third-party malicious code.

The next time the user, who has registered to site using the authentication service in accordance with embodiments of the present invention, visits the site, and after providing the personal identification information with which the user is registered at that site (to perform login), the site issues an authentication request to the authentication module which includes the two security keys that were assigned to the site at the registration of the site to the service (e.g. the site token and the connection token) and the attach token which is associated with the identified user in the registration record of that user at the site. The authentication module, in turn, generates a confirmation request which includes a temporary confirmation key that is communicated to the handset. The use of the temporary confirmation key facilitates that only the authentication module knows which site and user require authentication for that particular action, whereas the site has no knowledge of the mobile equipment identity information of the handset.

The application running on the handset may then prompt the user to confirm the action by inputting a confirmation command, for example, by presenting a confirmation screen (e.g. Push Message) and requiring the user to press a key or otherwise operate the handset so as to make the application receive the confirmation command.

If the user inputs a confirmation command into the handset, a confirmation message may then be communicated to the authentication module, which in turn sends the secret token corresponding to the attach token that was sent by the site in the authentication request. The confirmation proxy screen is then closed and the authentication module may send the secret token of the user to the site for verification against the registration information of that user at the site.

Without the user confirming the action using the handset the action is not authorized to the site by the authentication module.

While the process described hereinabove referred to authentication of a user attempting to access a site, it should be understood that an authentication method (and corresponding system), in accordance with embodiments of the present invention, may be used in connection with various kinds of actions that require authentication (e.g. accessing a site, retrieving confidential information from a site, performing a transaction, charging a credit card, etc.)

Reference is now made to the figures.

FIG. 1 illustrates a method 100 for authenticating a user at a site, in accordance with embodiments of the present invention.

Method 100 may include registering 102 the user and at least one communication device associated with that user with an authentication module, identifying each of said at least one communication devices by a unique hardware identification number, and registering 104 the site with the authentication module. The order of registration may not be important.

Method 100 may further include associating 106 the user and his (or hers) one or more communication devices with the site by the authentication module. This means that the association between the user and his communication device is known to the authentication module. Method 100 may also include requesting 108 the user to confirm the action by sending a confirmation request from the site to the communication device associated with that user by the authorization module, and authorizing 110 the user to the site upon receiving the confirmation from said at least one communication devices.

Figure 2A:
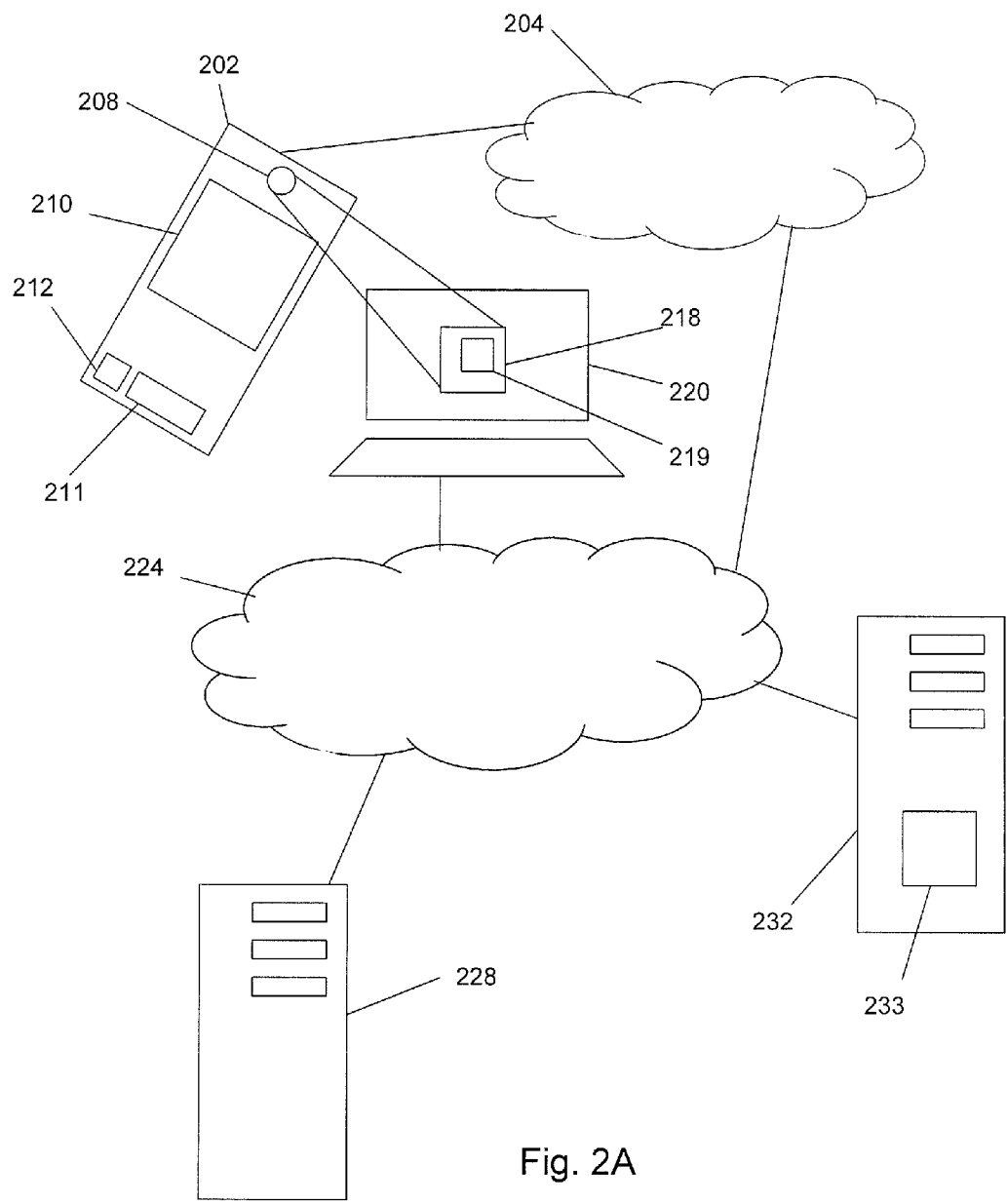
FIG. 2A illustrates registration of a user and his communication device to an authentication service, in accordance with embodiments of the present invention.

FIG. 2A illustrates registration of a user and his communication device to an authentication service, in accordance with embodiments of the present invention.

An owner or operator of site 233 (hereinafter referred to as—"the site") hosted on server 232 who wants to subscribe to an authentication service, in accordance with embodiments of the present invention, may register to this service with authentication module 228 (e.g. on a remote server, or at a local device) upon which two personal keys are issued by the authentication module 228 to the site—a site token and a connection token, both unique for that site. The site 233 may receive the keys in a computer executable code, for example:

```
<script src="http://securepush.com/cdn/securepush-register.js"
type="text/JavaScript" ></script>
<input type="hidden" id="QVR-SITE-ID"
value="B3C1211C-758C-48FF-9010-
9AD7C36368D9" />
<input type="hidden" id="QVR-CONNECTION-TOKEN"
value="6A17D7D2-
708A-42EA-9722-B6F6A7212847" />
<input type="hidden" id="QVR-LANG" value="en" />
```

(Examples of Two Personal Codes are Indicated in Bold Characters)

The site 233 may also be provided with a proxy file that facilitates cross-domain display of information from the authentication module 228 on the user's display at his station 220 (e.g. terminal, PC), when browsing to the site 233.

The code may be then embedded in the appropriate page at the site 233 (typically in the registration and log-in pages).

A user, wishing to register to a multi-factor authentication service, is required to have a mobile communication device, e.g. handset such as a smartphone 202. Smartphone 202 is operating on and communicating via telecommunication network 204. Installed on smartphone 202 is authentication application 211, which may be a software application, hardware application or a combination of both. Application 211 may be initially installed in smartphone 202 at by the manufacturer of the smartphone, the telecommunication service provider, or downloaded by the user and installed on to the device.

The user may be prompted, upon installing the authentication application 211, to perform an initial registration by providing a few identifying details, such as, for example, a username, a password and an email address. The registration may be verified by sending a confirmation to the email address that was provided by the user, thus facilitating retrieval of the password by the user at a later time, if the password is forgotten. During the registration process the smartphone is registered by sending a mobile equipment identity information 212, which is embedded in smartphone 202, and distinctly and uniquely identifies the handset.

When the user visits site 233 to which authenticated access is required, hosted on server 232, by accessing the site by a local station (e.g. terminal, PC) 220, over communication network 224 (e.g. the Internet), the user may first register to the site by selecting a username and password (preferably not the same ones that the user has used for registering with the authentication service). The user may then be offered the possibility of registering, or may be required to register to, a multi-factor authentication service, according to embodiments of the present invention. Upon requesting this service, the site 233, hosted on server 232 communicates the request to authentication module 228 (e.g. over communication network 224). Authentication module 228 may present to the user with an ascription screen 218 (e.g. employing cross-domain technique) on the local display of the user's station 220 in which the two keys that were assigned to the site (e.g. the site token and the connection token, both of which typically are permanent keys), as well as a third user-specific personal key (e.g. attach key, which typically is a temporary key) issued by authentication module 228 at a specific time and which remains valid for a prescribed time, are presented. According to some embodiments of the present invention the three keys may be presented to the user in the form of a barcode 219. Barcode 219 may be, for example, a one-dimensional bar-code (e.g. linear barcode) or two-dimensional barcode (matrix barcode, such as, for example Quick-Response—QR-code.

The user may be prompted (e.g. using the display 210 of smartphone 202) to point the camera 208 of the smartphone 202 to the ascription screen where barcode 219 is presented by the authentication module 228 at the site 233 (e.g. using cross-domain communication technology), and the image may be acquired (either by the user activating the camera or when the barcode 219 is automatically identified by application 211 on smartphone 202). Application 211 may process the acquired image of barcode 219 to retrieve the three keys and sends the three codes to authentication module 228 over a communication link (typically via the telecommunication network the smartphone is registered to and over the network the site is communicating with, such as the Internet). If the three keys are matched with the keys saved at authentication module 228 than a forth key is generated by authentication module 228 (secret key, which is the ascription key for final ascription of the smartphone to the site) and the attach key and secret key are communicated to the site 233, where they are kept for future reference, associated with the user.

Figure 2B:
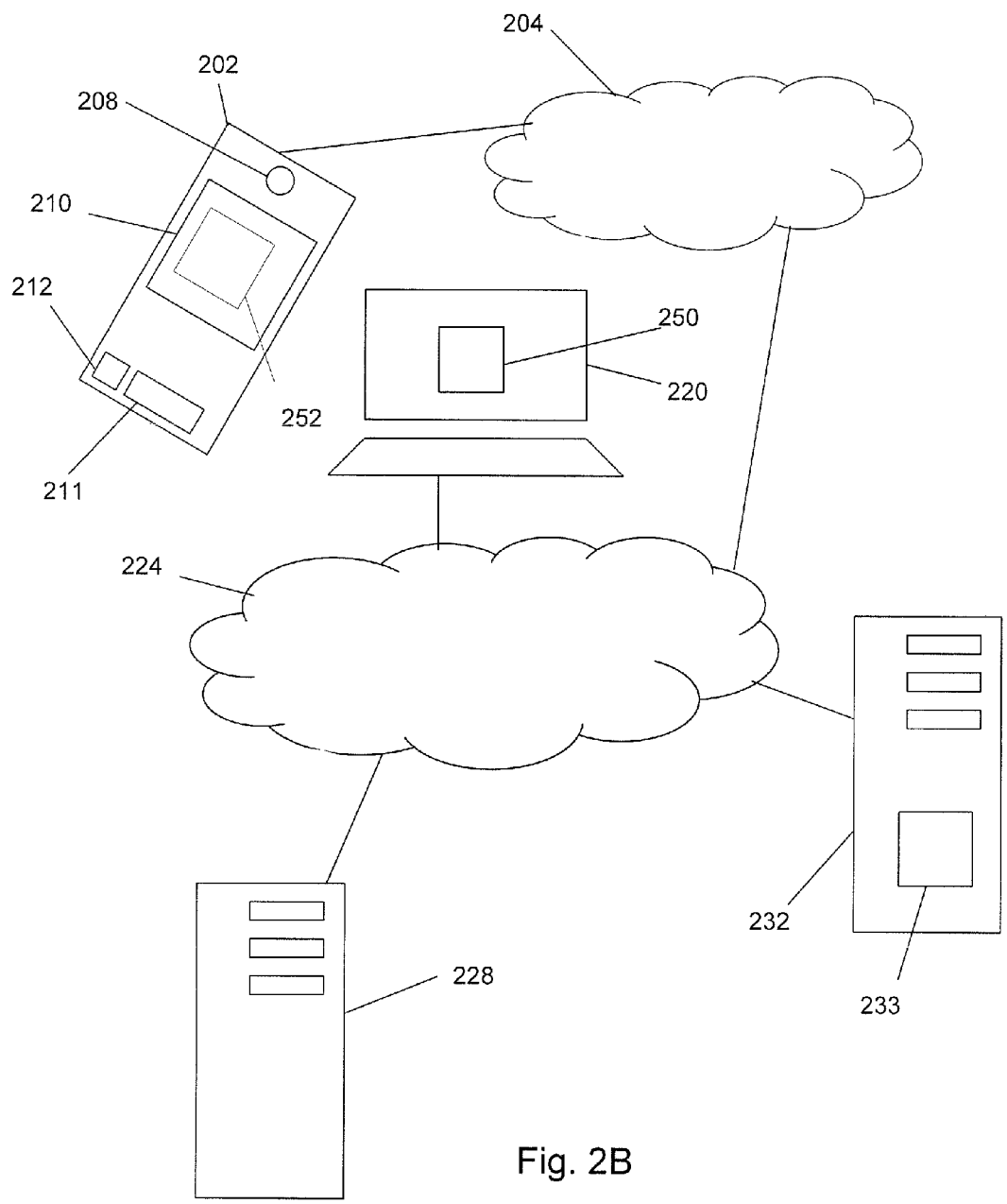
FIG. 2B illustrates authentication of a registered user attempting to perform an action at a site, in accordance with embodiments of the present invention.

FIG. 2B illustrates authentication of a registered user attempting to perform an action at a site, in accordance with embodiments of the present invention.

The registered user who is trying to perform an action at site 233 (e.g. local or remote site), first supplies the personal identification information with which the user is identified at site 233 (registration information). Then site 233 may then call for a proxy confirmation screen 250 to be presented by authentication module 228 on the display of station 220, which prompts the user to confirm the action using the smartphone. In other embodiments of the present invention no such confirmation screen 250 is presented on the display of station 220. Site 233 sends to authentication module 228 the site token and connection token as well as the attach token associated with the user requesting authentication at site 233.

Authentication module 228 then sends a temporary key to smartphone 202 for confirmation and the user. Upon being prompted to do so (e.g. using prompted message 252 displayed on display 210 of smartphone 202), the user may then confirm the action. The confirmation message is communicated to authentication module 228, and upon receipt of that confirmation, retrieves the secret token associated with the attach token that was sent by site 233 when requesting the authentication of the user, and sends to the site the secret token allowing the site to verify that the secret token is indeed associated at site 233 with the user.

In accordance with embodiments of the invention, a method for authenticating the user may include determining a location for one or more of said at least one mobile communication device and verifying that that location is within one or more zones. These zones may include a zone within which the user is supposed to be.

The step of requesting the user to confirm the action and the step of authenticating the user may be subjected to a time limit in some embodiments.

To-date, credit cards are designed to be used by single users only. Even in organizations where transaction authorization is legally required from several executives of that organization, it is impossible to enforce this policy when using credit cards.

Embodiments of the invention may facilitate the performance of actions that require authorization by more than one user. For example, the present invention may be used to facilitate transactions in bank accounts or in credit cards where an authorization is required from several users.

When a bank issues new credit cards or opens a new bank account to an organization that has an authorization policy requiring more than one authorizing officer to authorize transactions, the bank may, according to embodiments of the invention, require that each of the authorizing officers that are required to authorize transaction register with their communication devices. For example, each authorizing officer is required to associate himself (or herself) to one or more communication devices.

Figure 3:
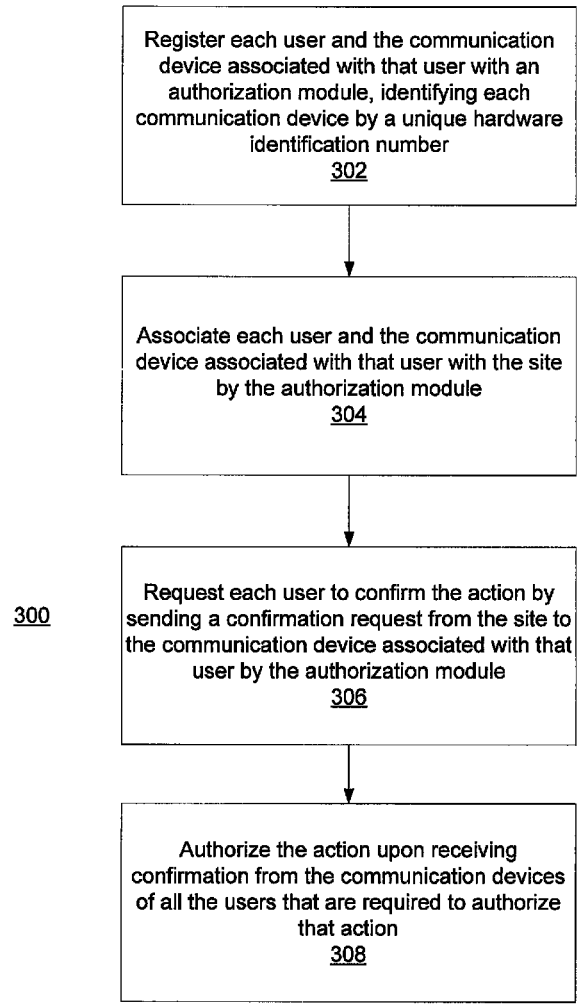
FIG. 3 illustrates a method for authorizing a single action by a plurality of users at a site, in accordance with embodiments of the present invention.

FIG. 3 illustrates a method for authorizing a single action by a plurality of users at a site, in accordance with embodiments of the present invention.

Method 300 may include registering 302 each user and a communication device (one or more) associated with that user with an authorization module, identifying each of the communication devices by a unique hardware identification number. Method 300 may also include associating 304 each of the users and the communication device associated with that user with the site by the authorization module. Method 300 may also include requesting 306 each of the users to confirm the action by sending a confirmation request from the site to the communication device associated with each of the users by the authorization module. Method 300 may further include authorizing 308 the action upon receiving confirmation from the communication devices of all users that are required to authorize that action.

Figure 4:
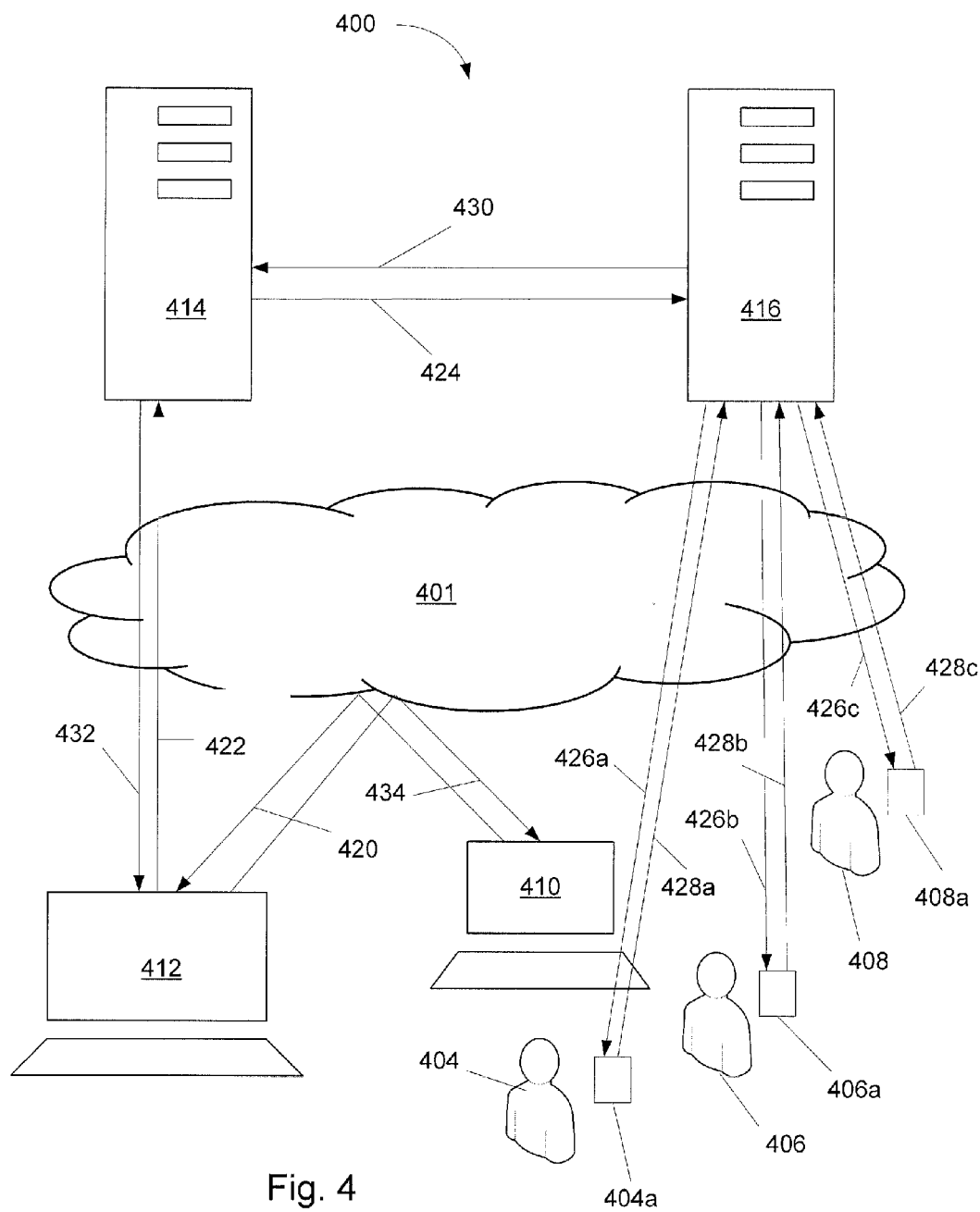
FIG. 4 illustrates a system for authorizing a single action by a plurality of users at a site, in accordance with embodiments of the present invention.

FIG. 4 illustrates a system 400 for authorizing a single action by a plurality of users at a site, in accordance with embodiments of the present invention.

A clearing house 414 (e.g. a credit card clearing house or a banking clearing house) may require that a transaction made on behalf of a client (e.g. a firm, an association, a private person subjected to legal limitations as a minor or a person under custody, etc.) be authorized by a group of persons, such as, for example, partners in a partnership, executives of a firm, a minor and one or two parents of that minor, a person under the custody of one or more custodians and these custodians.

For example, a secretary 404 of a firm and two executives 406 and 408 are required to authorize a transaction with clearing house 414, in order to validate and complete that transaction.

Initially the persons required to authorize an action register with an authorizing service, in accordance with embodiments of the present invention by registering themselves and their communication devices, so that each of these persons and one or more communication devices in that person's possession are associated at an authorization module, managing the authorization procedure. The communication devices are identified using the unique hardware identification numbers of these devices.

For example, the registration methods described hereinabove and in the accompanying figures (see FIG. 2A) may be used.

For example, when opening a bank account or when applying for a credit card, each of the persons required to authorize a transaction, may be required to have a dedicated application be installed on that person's communication device, and associate each person with that person's mobile communication devices, for example using a unique QR code that may be presented to each of the persons and acquired by the camera of the mobile communication device of that person, similarly to the registration manner described hereinabove. The number of persons required to authorize a transaction and their identities are recorded and saved.

Clearing house 414 may also register with the authorization service, in accordance with the present invention.

The registration information of the persons (hereinafter—users, 404, 406 and 408) and their associated mobile communication devices 404a, 406 and 408a), as well as registration details of the clearing house 414 are saved and used by authorization server 416 (hosting the authorization module managing the authorization method in accordance with embodiments of the present invention).

Secretary 404 may browse using a local station 410 connected over a network 401 to remote shopping site 412. Upon deciding to make a purchase at site 412 the secretary inputs 420 the transaction details, such as, for example, the item to be purchased, shipping method address for deliver and credit card details.

Shopping site 412, communicates 422 the transaction details to clearing house 414, which in turn sends a confirmation request 424 to authorization server 416. Authorization server 416 determines the appropriate persons that are required to authorize the transaction (in this example 404, 406 and 408) and sends a confirmation requests (426a, 426b and 426c) to the mobile communication devices (404a, 406a and 408a) associated with these users. Each user may then be prompted by the dedicated application running on his (or hers) mobile communication device to confirm the transaction by pressing a key or otherwise input a confirmation. Only when confirmations (428a, 28b and 428c) from all users required to authorize the transaction (e.g. 404, 406 and 408) are received at the authorization server an authorization communication 430 is forwarded to clearing house 414, which then confirms 432 the transaction to shopping site 412. A confirmation message 434 (e.g. an invoice or a receipt) may then be communicated to the secretary station 410.

According to embodiments of the present invention, a method for authorizing a single action by a plurality of users at a site may include determining the location of one or more of the mobile communication devices of the users required to authorize the action and verifying that that location is within one or more zones (e.g. by using the device internal GPS). These zones may be, for example, places where the users are known or supposed to be in, such as, for example near the site of the transaction (if the site is a physical point of sale—POS, which is accessed by one or more of the users physically).

According to embodiments of the present invention, the authorization module may be located on a server remote from the clearing house. In other embodiments, the authorization module may be located on a local server at the clearing house.

According to embodiments of the invention, the steps of requesting each user to confirm the action and the step of authorizing the action are subjected to a time limit.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for authorizing performance of an action at a site, the method comprising:
   registering each user of a plurality of users and at least one mobile communication device associated with that user with an authorization module hosted on an authorization server, identifying each of said at least one mobile communication device by a unique hardware identification number, and specifying the user or users of said plurality of users that are required to authorize the action;
   associating each user of said plurality of users and said at least one mobile communication device associated with that user with the site by the authorization module;
   receiving by the authorization server an authentication request from the site for a user of said plurality of users that is attempting to perform the action at the site from a station;
   sending by the authorization module a confirmation request from the authorization server to said at least one mobile communication device associated with each user of said user or users of said plurality of users that are required to authorize the action, requesting of that user to operate said at least one mobile communication device associated with that user to confirm authorization of the action; and
   authorizing performance of the action upon receiving confirmation from the mobile communication devices associated with all said user or users of said plurality of users that are required to authorize the action.

2. The method of 1, comprising registering the site with the authorization module.

3. The method of claim 1, comprising installing a dedicated application in the communication device of each of the plurality of users.

4. The method of claim 1, wherein said at least one mobile communication device comprises at least one cellular telephone.

5. The method of claim 4, wherein said at least one cellular telephone comprises at least one smartphone.

6. The method of claim 1, further comprising determining a location for one or more of said at least one mobile communication device and verifying that that location is within one or more zones.

7. The method of claim 6, wherein said one or more zones include a zone within which one or more of said plurality of users is supposed to be.

8. The method of claim 1, wherein the steps of requesting each user to confirm the action and the step of authorizing the action are subjected to a time limit.

* * * * *